United States Patent [19]

Arcella et al.

[11] 4,140,337
[45] Feb. 20, 1979

[54] HERMETIC QUICK CONNECTION AND SEAL FOR COUPLING LOW PRESSURE SYSTEMS

[75] Inventors: Frank G. Arcella, Bethel Park; Albert F. Berringer, Apollo; John S. Billings, Jr., Trafford, all of Pa.

[73] Assignee: Electric Power Research Institute, Inc., Palo Alto, Calif.

[21] Appl. No.: 780,776

[22] Filed: Mar. 24, 1977

[51] Int. Cl.$^2$ .................................................. F16L 35/00
[52] U.S. Cl. ........................................ 285/3; 285/219; 285/355
[58] Field of Search .................. 285/3, 4, 219, 355; 137/318, 317; 220/288, 207, 267, 277, 278; 221/31; 222/81, 83, 89, 91, 541

[56] References Cited

U.S. PATENT DOCUMENTS

| | | | |
|---|---|---|---|
| 334,520 | 1/1886 | Dodge | 137/318 X |
| 1,433,117 | 10/1933 | Markle | 285/3 |
| 1,657,033 | 1/1928 | Pollock | 220/278 X |
| 1,701,691 | 2/1929 | Mueller et al. | 137/318 X |
| 2,107,802 | 2/1938 | Rouch | 285/219 X |
| 3,101,207 | 8/1963 | Povel et al. | 285/355 X |
| 3,233,780 | 2/1966 | Cheeley | 222/91 X |
| 3,240,227 | 3/1966 | Burkholder | 137/318 |
| 3,448,779 | 6/1969 | Horwitt | 137/318 X |
| 3,460,721 | 8/1969 | Homel et al. | 137/318 X |
| 3,847,418 | 11/1974 | Semprevivo | 285/423 X |

FOREIGN PATENT DOCUMENTS 19615 10/1904 Sweden .................................. 137/318

Primary Examiner—Dave W. Arola
Attorney, Agent, or Firm—Flehr, Hobach, Test, Albritton & Herbert

[57] ABSTRACT

In making a quick connection and hermetic seal for coupling low pressure systems of a type such as heat pipes and the like, a pre-installed fitting forming the sealing portion of a quick connection assembly is disposed in a depression formed in the sidewall of the low pressure chamber so that the chamber and the sealing portion of the connecting assembly can be fully processed together. The open end of a second system is coupled into the inserted sealing fitting by means of threads formed about a pipe plug device and carried by the tubular end portion of the second system. Sealant applied between the threads of the plug and fitting so that as the plug advances along the fitting a gas-tight seal will be obtained. The fitting includes a sealing membrane disposed across the inserted end thereof to be upset by advancing movement of the tubular end portion carried by the plug.

3 Claims, 3 Drawing Figures

U.S. Patent     Feb. 20, 1979     4,140,337
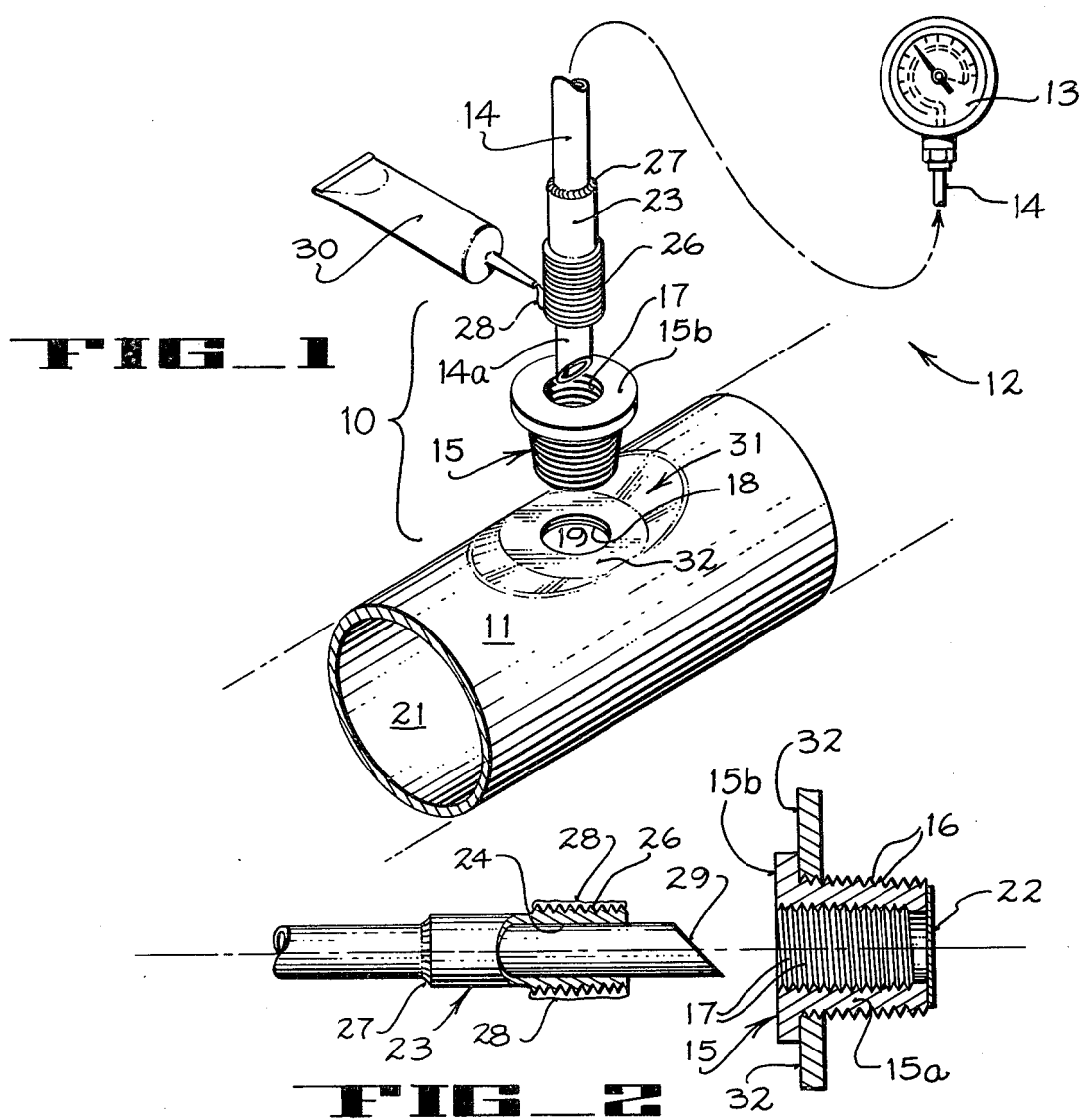
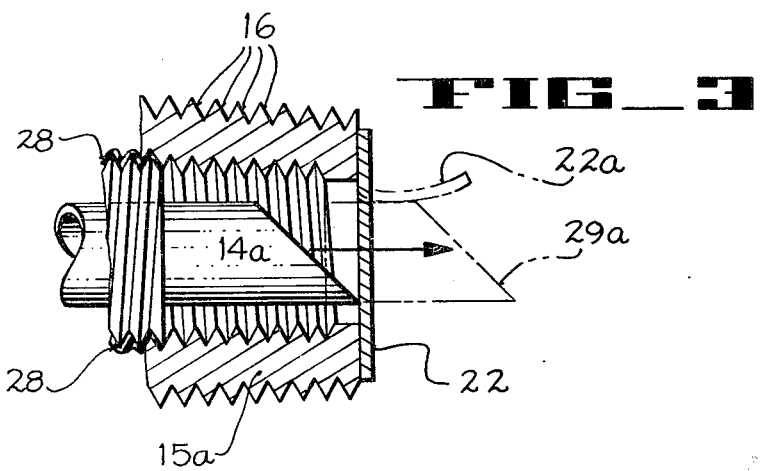

HERMETIC QUICK CONNECTION AND SEAL FOR COUPLING LOW PRESSURE SYSTEMS

BACKGROUND OF THE INVENTION

This invention pertains to quick connection devices and more particularly to a coupling assembly having a pre-installed portion for hermetically connecting two sealed low pressure systems.

In the manufacture and processing of elongate heat pipes or other low pressure systems charged with a working fluid, such as methanol, it has been considered difficult if not impossible to attach radial fittings or diagnostics prior to completing processing of such low pressure systems. During processing of such systems, movement of the product through a plant concurrent with manufacturing and processing operations necessarily tends to damage any such preattached device.

As a post-processing diagnostic of heat pipe performance, Bourdon tube compound gauges can indicate vacuum level during inoperative operating periods whereby they can be used to determine the integrity of heat pipe seals and joints. The Bourdon gauge also can detect pressures during operating periods by relying on the vapor pressure curve of methanol as a working fluid which can be related to operating temperature within plus or minus 2° C. accuracy.

One problem, however, exists in attaching such a Bourdon tube compound gauge diagnostic to a fully processed heat pipe since at no time should the heat pipe hermetic seal or envelope be broken and exposed to ambient air since an inrush of non-condensable gases will occur so as to destroy the processed state of the heat pipe. Commercially available quick connections which are vacuum tight have tended to protrude radially to too great an extend from the side of the heat pipe surface; degrade with time, such as when employing rubber O-rings, seals or gaskets; and were costly.

Accordingly, there has been a need to apply radial fittings or diagnostics to heat pipes or the like without protruding too greatly radially of the pipe. It has further been desirable to attach a sealed portion of these connections to the heat pipe prior to the processing of the heat pipe, i.e. prior to preparing the heat pipe.

SUMMARY OF THE INVENTION AND OBJECTS

In general, in a low pressure vacuum system of the type adapted to receive a branch connection attached thereto and having a hollow elongate chamber of annular cross-section the sidewall of the chamber carries a pre-installed hermetic fitting such as a reducing bushing extending radially into the chamber in sealed gas tight relation prior to processing the chamber. The fitting includes a relatively short cylindrical body formed with an axially disposed bore. Internal threads extend along the bore and external threads are carried around the body of the fitting. A thin rupturable metal membrane seals the inserted end of the fitting. A cylindrically shaped coupling element having external threads therearound and an elongate axial opening containing a tube fixed therein threadedly engages the internal threads of the fitting. The tube protrudes from the inserted end of the coupling element and is formed with a sharp edge for rupturing the membrane as the coupling element is threaded into the fitting so as to form a branch connection into the chamber. Means forming a seal between the internal threads of the fitting and the external threads of the coupling element serve to maintain the integrity of the branch connection.

BRIEF DESCRIPTION OF THE DRAWINGS

FIG. 1 shows an exploded perspective view of a hermetic quick connection and seal according to the invention joining two low pressure systems together;

FIG. 2 shows an exploded side elevation section view of the relationship of the cylindrically shaped coupling element with regard to its associated fitting 2nd seal; and FIG. 3 shows a side elevation section view of the fitting and coupling element joined in a manner in which the sealing membrane is upset by advancing movement of the coupling element.

DETAILED DESCRIPTION OF A PREFERRED EMBODIMENT

As shown in FIG. 1 a coupling assembly 10 forms a hermetically sealed interconnection between two sealed low pressure systems, such as that represented by the heat pipe shown in FIG. 1 as the cylindrical pipe portion 11 and a sensing system 12 represented by the Bourdon gauge 13 and connecting tubing 14.

Accordingly, pipe portion 11 as shown herein serves to represent a hollow chamber under vacuum. Assembly 10 comprises a fitting, such as the reducing bushing 15, having a hollow substantially cylindrical body portion 15a formed with an axially extending bore therethrough, external threads 16 and internal threads 17. Threads 16 are adapted to engage threads 18 formed about an opening 19 leading into the hollow chamber 21. Bushing 15 includes a radial flange at its outer end disposed to engage the edge margin about opening 19 to preclude movement of bushing 15 fully through opening 19 into chamber 21.

Means forming an upsettable seal on the inner or insertable end of bushing 15 comprises a thin, rupturable metal membrane 22 braised to the end of bushing 15 for sealing the inner end thereof when disposed within chamber 21. Braising membrane onto bushing 15 minimizes any tendency for non-condensible gas to be emitted and to be drawn into chamber 21.

Means for coupling the sensing system 12 with the vacuum within chamber 21 comprises a substantially cylindrical coupling body 23 having an open passageway 24 disposed axially therethrough and having threads 26 disposed therearound for engaging threads 17 for drawing body 23 axially into bushing 15.

Tubing 14 extends through passageway 24 for providing a flow passage or gas connection between the interior of cylinder 11 and gauge 13. The protruding end portion 14a of tubing 14 includes a tapered or beveled edge so as to provide a sharp cutting edge thereto for rupturing membrane 22. Braising 27 fixes tubing 14 within passageway 24 whereby as coupling body 23 is threaded into bushing 15 the protruding end 14a of tubing 14 will advance and upset membrane 22 dislodging a portion 22a to provide a fluid connection between the two systems 11, 12.

A gas-tight seal is provided between threads 26 and 17 by application of a known pipe sealant 28 such as dispensed from a compressible tube 30. Beveled edge 29 of tube 14 intercepts membrane 22 after something of the order of 2 ½ to 3 turns of body 23. Accordingly, the sealant 28 hermetically seals the interface between bushing 15 and the threads of body 23, sometimes called a "pipe plug". Continued turning of the "plug" causes edge 29 to intercept, upset, and cut through membrane 22 to provide pressure communication between the two systems 21 and 12.

For purposes of permitting the high vacuum system represented by cylinder portion 11 to be fully processed or prepared even while including a radially extending quick connection, the sidewall of cylinder portion 11 includes a depression of pocket 31 formed into the rounded outer surface of cylinder portion 11. Pocket 31 includes a substantially smooth flat sealing surface 32 disposed around opening 19. Depression 31 serves to reduce the radial protrusion of bushing 15 from the longitudinal axis of the chamber defined within cylinder 11.

In operation, before a connection is made between the two systems, gauge 13 and tubing 14 are evacuated and back-filled with methanol, (assuming that the heat pipe working fluid within chamber 21 is also methanol). Thus, a noncondensible gas will not be introduced into the heat pipe unit (represented by chamber 21) when the connection is made. Threads 26 of coupling body 23 are coated with sealant 28 and started into bushing 15. The beveled edge 29 ultimately reaches the surface of membrane 22 whereby further urging of tube 14 toward membrane 22 serves to upset the membrane for fluid connection between the two systems.

We claim:

1. In combination first and second hermetically sealed independent low pressure systems, one of said systems including an elongate hollow chamber under vacuum, a coupling assembly for hermetically connecting said first and second systems, a threaded opening leading into said hollow vacuum chamber, said assembly comprising a fitting having a hollow substantially cylindrical body portion formed with external and internal threads, said external threads serving to engage said threaded opening, a thin, rupturable metal membrane sealing the inner end of said fitting when disposed within said opening, a substantially cylindrical coupling body having an open passageway disposed axially therethrough and having threads therearound for engaging said internal threads, tubing carried by said body in fixed relation thereto to move therewith, said tubing being disposed to extend through said passageway, means forming a hermetic seal between said tubing and said coupling body, one end of said tubing protruding from the last named said body and having an edge for rupturing said membrane as the last named said body is threaded into said fitting, and sealant means carried by said threads of said coupling body forming a gas-tight seal between said internal threads and the threads of the last named said body at a position therealong sufficiently displaced from said membrane so as to effect sealing between said internal threads and the last named threads before said membrane is ruptured.

2. In a low pressure vacuum system of a type adapted to receive a branch connection attached thereto and having a hollow elongate chamber of cylindrical cross-section, a pre-installed hermetic fitting carried by the sidewall of said chamber to extend radially thereof in sealed gas-tight relation therethrough, said fitting having a relatively short body formed with a bore therealong, internal and external threads carried around and within said body respectively, and a thin rupturable metal membrane sealing the inserted end of said fitting, female threads formed around an opening extending through the wall of said chamber for receiving said body therethrough, said external threads serving to engage said female threads to carry said body by the sidewall of said chamber disposed to extend into said chamber, a cylindrically shaped coupling element having external threads therearound received by said internal threads of said fitting and an elongate axial opening therethrough, a tube in said axial opening and disposed to protrude from the inserted end of said coupling element, means for fixing said tube in hermetically sealed relation to and within said axial opening of said coupling element to cause said tube to move with said coupling sleeve, said tube being formed with a cutting end for rupturing said membrane only after said coupling element is threaded into said fitting for something of the order of 2 ½ to 3 turns, and sealant means serving to form a hermetic seal between said coupling element and said bore by the completion of said turns so as to form a hermetic branch connection to said chamber.

3. In a low pressure vacuum system of a type adapted to receive a branch connection hermetically coupled thereto via a pre-installed fitting of a type having a relatively short cylindrical body formed with a hollow bore extending axially therealong and having a thin rupturable sealing membrane closing the insertable end of said fitting, said body having internal and external threads therealong, a connecting system including an elongate tube portion, the end of said tube portion being formed to provide a cutting end thereto for upsetting the membrane when urged thereagainst, a cylindrically shaped coupling element having external threads therearound for engaging said internal threads, an elongate axial opening in said element containing said tube portion therein to protrude from the insertable end of said coupling element to a degree for rupturing said membrane after said coupling element is threaded into and sealed to said bore of said fitting so as to form a branch connection to said chamber via said tube portion, means for fixing said tube portion in hermetically sealed relation to and within said axial opening of said coupling element to cause said tube portion to move with said coupling element to engage and upset said membrane to hermetically form said branch connection, and sealant means for sealing said external threads of the coupling element with said internal threads during movement of said cutting end toward said membrane and prior to rupture of said membrane to provide a gas tight connection therebetween.

* * * * *